(12) United States Patent
Su et al.

(10) Patent No.: US 11,244,449 B2
(45) Date of Patent: Feb. 8, 2022

(54) IMAGE PROCESSING METHODS AND APPARATUSES

(71) Applicant: BEIJING SENSETIME TECHNOLOGY DEVELOPMENT CO., LTD., Beijing (CN)

(72) Inventors: Liu Su, Beijing (CN); Ruijian Yang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 46 days.

(21) Appl. No.: 16/920,972

(22) Filed: Jul. 6, 2020

(65) Prior Publication Data

US 2020/0334812 A1 Oct. 22, 2020

Related U.S. Application Data

(63) Continuation of application No. PCT/CN2019/119534, filed on Nov. 19, 2019.

(30) Foreign Application Priority Data

Mar. 6, 2019 (CN) .......................... 201910169503.4

(51) Int. Cl.
*G06T 7/00* (2017.01)
*G06K 9/00* (2006.01)
(Continued)

(52) U.S. Cl.
CPC ........ *G06T 7/0012* (2013.01); *G06K 9/00228* (2013.01); *G06K 9/00288* (2013.01);
(Continued)

(58) Field of Classification Search
CPC ......... G06K 2009/363; G06K 9/00228; G06K 9/00281; G06K 9/00288; G06T 11/60;
(Continued)

(56) References Cited

U.S. PATENT DOCUMENTS

2012/0113106 A1 5/2012 Choi
2018/0232561 A1* 8/2018 Zheng ................ G06K 9/00281

FOREIGN PATENT DOCUMENTS

CN 103337085 A 10/2013
CN 104268591 A 1/2015
(Continued)

OTHER PUBLICATIONS

First Office Action of the Chinese application No. 201910169503.4, dated Jul. 27, 2020, 38 pgs.
(Continued)

*Primary Examiner* — Manuchehr Rahmjoo
(74) *Attorney, Agent, or Firm* — Cooper Legal Group, LLC

(57) ABSTRACT

An image processing method includes: obtaining a first image, identifying a facial region in the first image, and determining keypoint information related to the facial region, where the keypoint information includes keypoint information of the facial region and external edge keypoint information, and a region corresponding to the external edge keypoint information includes the facial region and is larger than the facial region; and determining a plurality of deformation regions based on the keypoint information related to the facial region, and performing image deformation processing on the facial region based on at least part of the plurality of deformation regions to generate a second image.

18 Claims, 12 Drawing Sheets

```
┌─────────────────────────────────────────────────────────┐
│ Obtain a first image, identify a facial region in the   │  101
│ first image, and determine keypoint information         │
│ related to the facial region                            │
└─────────────────────────────────────────────────────────┘
                            │
                            ▼
┌─────────────────────────────────────────────────────────┐
│ Determine a plurality of deformation regions based on   │  102
│ the keypoint information, and perform image             │
│ deformation processing on the facial region based on    │
│ at least part of the plurality of deformation regions   │
│ to generate a second image                              │
└─────────────────────────────────────────────────────────┘
```

(51) Int. Cl.
*G06T 3/40* (2006.01)
*G06T 7/60* (2017.01)
*G06T 11/60* (2006.01)

(52) U.S. Cl.
CPC .............. *G06T 3/4007* (2013.01); *G06T 7/60* (2013.01); *G06T 11/60* (2013.01); *G06T 2207/30201* (2013.01)

(58) Field of Classification Search
CPC ......... G06T 2207/30201; G06T 3/4007; G06T 7/0012; G06T 7/33; G06T 7/60
See application file for complete search history.

(56) References Cited

FOREIGN PATENT DOCUMENTS

| | | |
|---|---|---|
| CN | 104992402 A | 10/2015 |
| CN | 105205779 A | 12/2015 |
| CN | 107330868 A | 11/2017 |
| CN | 107341777 A | 11/2017 |
| CN | 107506732 A | 12/2017 |
| CN | 107680033 A | 2/2018 |
| CN | 107705248 A | 2/2018 |
| CN | 108229279 A | 6/2018 |
| CN | 108765274 A | 11/2018 |
| CN | 108830783 A | 11/2018 |
| CN | 108876704 A | 11/2018 |
| CN | 108985241 A | 12/2018 |
| CN | 109087238 A | 12/2018 |
| CN | 109087239 A | 12/2018 |
| CN | 109147012 A | 1/2019 |
| CN | 109377446 A | 2/2019 |
| CN | 109934766 A | 6/2019 |
| JP | 2011053942 A | 3/2011 |
| JP | 2016167131 A | 9/2016 |
| KR | 101165017 B1 | 7/2012 |
| KR | 20120130627 A | 12/2012 |
| KR | 20170047167 A | 5/2017 |
| KR | 20180125870 A | 11/2018 |
| TW | 201730808 A | 9/2017 |
| WO | 2017177634 A1 | 10/2017 |

OTHER PUBLICATIONS

"FaceMore: A Face Beautification Platform on the Cloud"; Jan. 2016; Lingu Liang, Deng Liu and Lianwen Jin; 2015 IEEE International Conference on Systems, Man, and Cybernetics; pp. 1798-1803.

"Face Image Processing Methods Utilized in Multi-pose Face Recognition"; Jul. 2005; Yanli Han; China Doctor Master Dissertations Full-text Database; 59 pgs.

Third Office Action of the Chinese application No. 201910169503.4, dated Jun. 15, 2021, 11 pgs.

First. Office Action of the Japanese application No. 2020-536145, dated Sep. 2, 2021, 4 pgs.

International Search Report in the international application No. PCT/CN2019/119534, dated Feb. 27, 2020, 2 pgs.

English translation of the Written Opinion of the International Search Authority in the international application No. PCT/CN2019/119534, dated Feb. 27, 2020, 5 pgs.

First Office Action of the Korean application No. 10-2020-7013711, dated Sep. 30, 2021, 15 pgs.

Notice of Allowance of the Chinese application No. 201910169503.4, dated Sep. 18, 2021, 5 pgs.

\* cited by examiner

IMAGE PROCESSING METHODS AND APPARATUSES

CROSS-REFERENCE TO RELATED APPLICATIONS

The present application is a continuation of International Application No. PCT/CN2019/119534, filed on Nov. 19, 2019, which claims priority to Chinese Patent Application No. 201910169503.4, filed on Mar. 6, 2019. The disclosures of International Application No. PCT/CN2019/119534 and Chinese Patent Application No. 201910169503.4 are hereby incorporated by reference in their entireties.

BACKGROUND

With the continuous development of image processing technologies, an increasing number of image processing modes have appeared to implement image processing on human faces. If only compressing processing is performed on a facial region, holes may appear in the image; and if stretching processing is performed on the facial region, pixels in the image may overlap.

SUMMARY

The disclosure relates to image processing technologies, and in particular, to an image processing method and apparatuses.

Embodiments of the disclosure provide an image processing method and apparatuses.

In order to achieve the foregoing objective, the technical solution of the embodiments of the disclosure is implemented as follows.

The embodiments of the disclosure provide an image processing method. The method includes: obtaining a first image, identifying a facial region in the first image, and determining keypoint information related to the facial region, where the keypoint information includes keypoint information of the facial region and external edge keypoint information, and a region corresponding to the external edge keypoint information includes the facial region and is larger than the facial region; and determining a plurality of deformation regions based on the keypoint information related to the facial region, and performing image deformation processing on the facial region based on at least part of the plurality of deformation regions to generate a second image.

The embodiments of the disclosure also provide an image processing apparatus. The apparatus includes: a memory storing processor-executable instructions; and a processor arranged to execute the stored processor-executable instructions to perform operations of: obtaining a first image, identifying a facial region in the first image, and determining keypoint information related to the facial region, wherein the keypoint information comprises keypoint information of the facial region and external edge keypoint information, and a region corresponding to the external edge keypoint information comprises the facial region and is larger than the facial region; and determining a plurality of deformation regions based on the keypoint information related to the facial region, and performing image deformation processing on the facial region based on at least part of the plurality of deformation regions to generate a second image.

The embodiments of the present application also provide a non-transitory computer-readable storage medium having stored thereon computer-readable instructions that, when executed by a processor, cause the processor to perform operations of an image processing method, the method including: obtaining a first image, identifying a facial region in the first image, and determining keypoint information related to the facial region, wherein the keypoint information comprises keypoint information of the facial region and external edge keypoint information, and a region corresponding to the external edge keypoint information comprises the facial region and is larger than the facial region; and determining a plurality of deformation regions based on the keypoint information related to the facial region, and performing image deformation processing on the facial region based on at least part of the plurality of deformation regions to generate a second image.

The embodiments of the disclosure also provide an image processing apparatus, including a memory, a processor, and a computer program stored on the memory and executable on the processor, where when the processor executes the program, operations of the method according to the embodiments of the disclosure are implemented.

DETAILED DESCRIPTION

The disclosure is further described in detail below with reference to the accompanying drawings and the specific embodiments.

Figure 1:
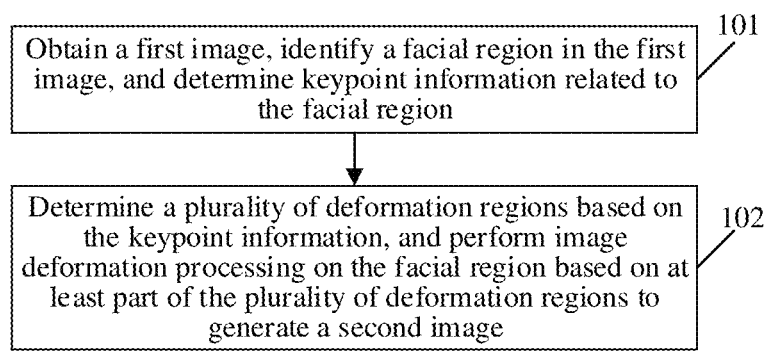
FIG. 1 is a schematic flowchart of an image processing method according to embodiments of the disclosure.

Embodiments of the disclosure provide an image processing method. FIG. 1 is a schematic flowchart of an image processing method according to embodiments of the disclosure. As shown in FIG. 1, the method includes the following operations.

At operation 101, a first image is obtained, a facial region in the first image is identified, and keypoint information related to the facial region is determined, where the keypoint information includes keypoint information of the facial region and external edge keypoint information, and a region corresponding to the external edge keypoint information includes the facial region and is larger than the facial region.

At operation 102, a plurality of deformation regions is determined based on the keypoint information, and image deformation processing is performed on the facial region based on at least part of the plurality of deformation regions to generate a second image.

In this embodiment, the first image includes a face of a target object, and the target object may be a real character in the image. In other implementations, the target object may also be a virtual character, such as a cartoon character. It may be understood that the first image includes a human face. In the embodiments of the disclosure, image processing is mainly performed on a human face in an image. Certainly, in the embodiments of the disclosure, image processing may also be performed on the faces of other target objects. In practical application, face recognition may be performed on the first image through a preset face recognition algorithm to identify a facial region in the first image.

In this embodiment, the keypoint information related to the facial region includes position information of a keypoint. Exemplarily, the position information of the keypoint may be represented by coordinate information of the keypoint. The keypoint information of the facial region includes keypoint information of an organ of the facial region and keypoint information of an edge of the facial region; the edge of the facial region corresponds to a contour of the facial region; and the external edge keypoint information is determined based on the keypoint information of the edge of the facial region. The keypoint information of the organ includes center keypoint information of the organ and/or contour keypoint information of the organ.

It may be understood that keypoints related to the facial region include: keypoints of organs included in the facial region, keypoints of the edge of the facial region, and external edge keypoints.

In some optional embodiments of the disclosure, with regard to operation 101, determining the keypoint information related to the facial region includes: obtaining keypoint information of organs in the facial region and the keypoint information of the edge of the facial region by performing detection on the facial region through a facial keypoint detection algorithm; and obtaining the external edge keypoint information based on the keypoint information of the edge of the facial region.

In some embodiments, obtaining the keypoint information of the edge of the facial region includes: obtaining information of a first group of contour points of a region below the eyes in the facial region; and determining information of a second group of contour points of a forehead region, and determining the keypoint information of the edge of the facial region based on the information of the first group of contour points and the information of the second group of contour points.

Determining the information of the second group of contour points of the forehead region includes: determining at least three keypoints of the forehead region; and determining keypoint information of the forehead region based on the at least three keypoints and the information of the first group of contour points. A first keypoint of the at least three keypoints is located on a midline of the forehead region; and a second keypoint and a third keypoint of the at least three keypoints are located on two sides of the midline.

In some embodiments, determining the keypoint information corresponding to the forehead region based on the at least three keypoints and the information of the first group of contour points includes: performing curve fitting based on keypoints located at two ends in the first group of contour points below the eyes in the facial region and the at least three keypoints in the forehead region to obtain curve fitting keypoint information; and performing interpolation processing on the curve fitting keypoint information based on a curve interpolation algorithm to obtain the keypoint information corresponding to the forehead region.

Figure 2:
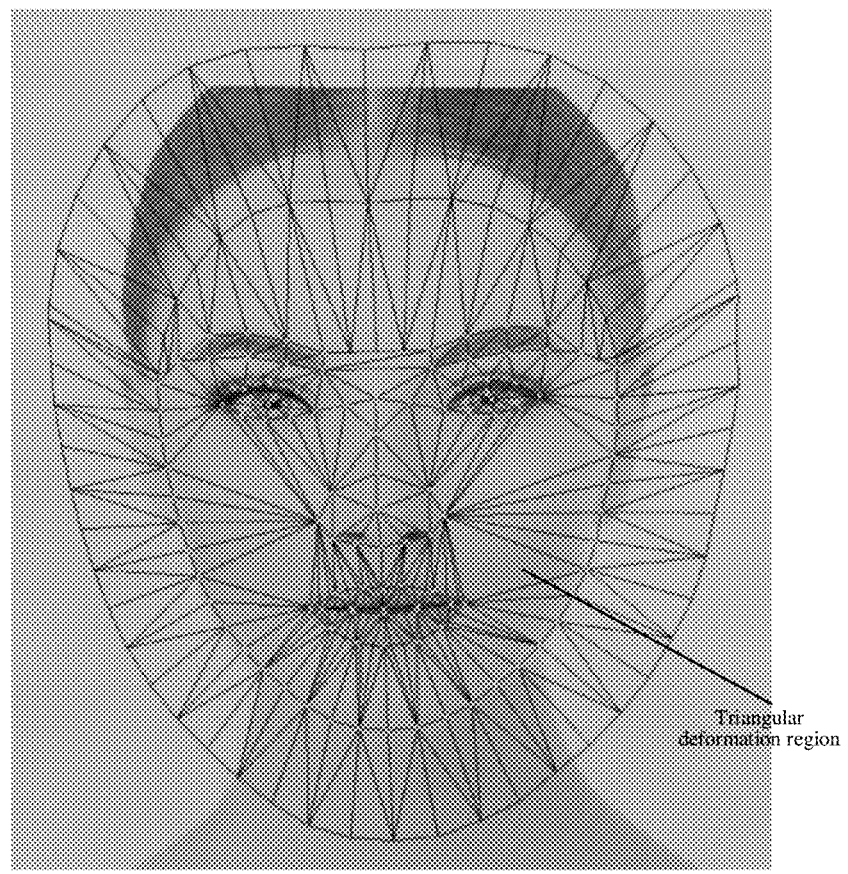
FIG. 2 is a schematic diagram of deformation regions in an image processing method according to embodiments of the disclosure.
Figure 3A:
FIG. 3A to FIG. 3C are schematic diagrams of face keypoints in an image processing method according to embodiments of the disclosure.
Figure 3B:
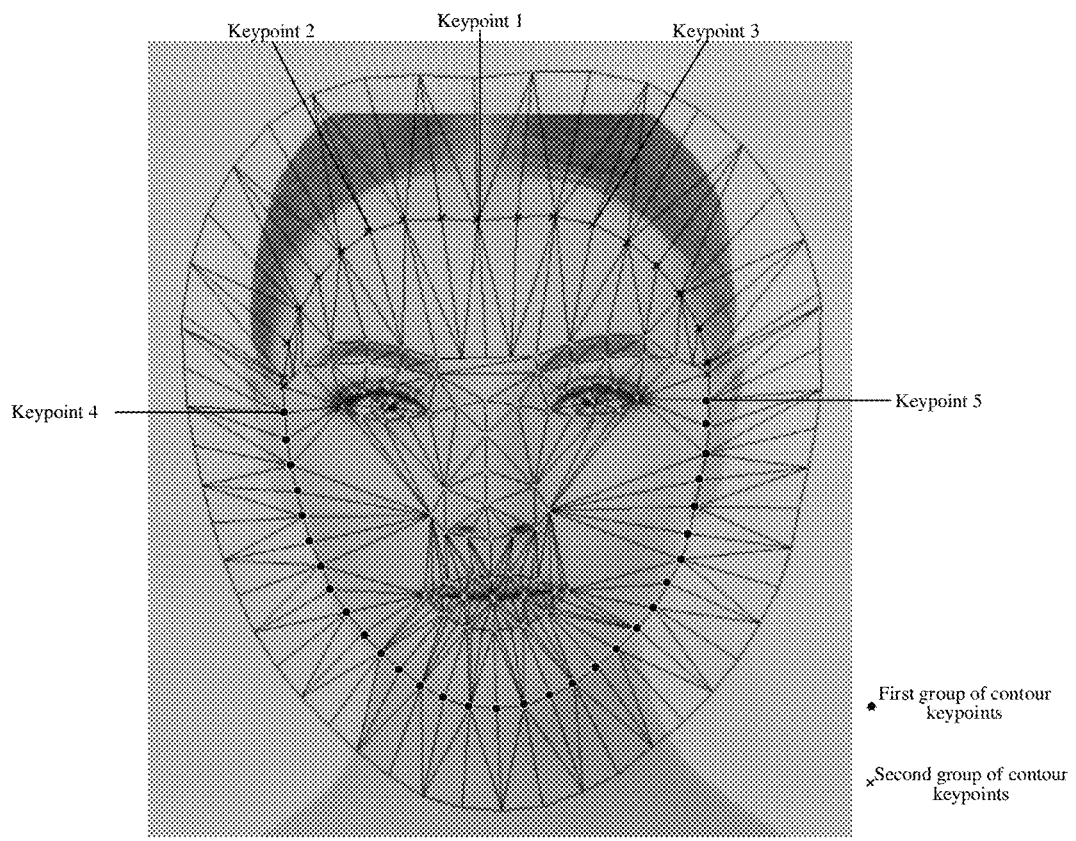
Figure 3C:
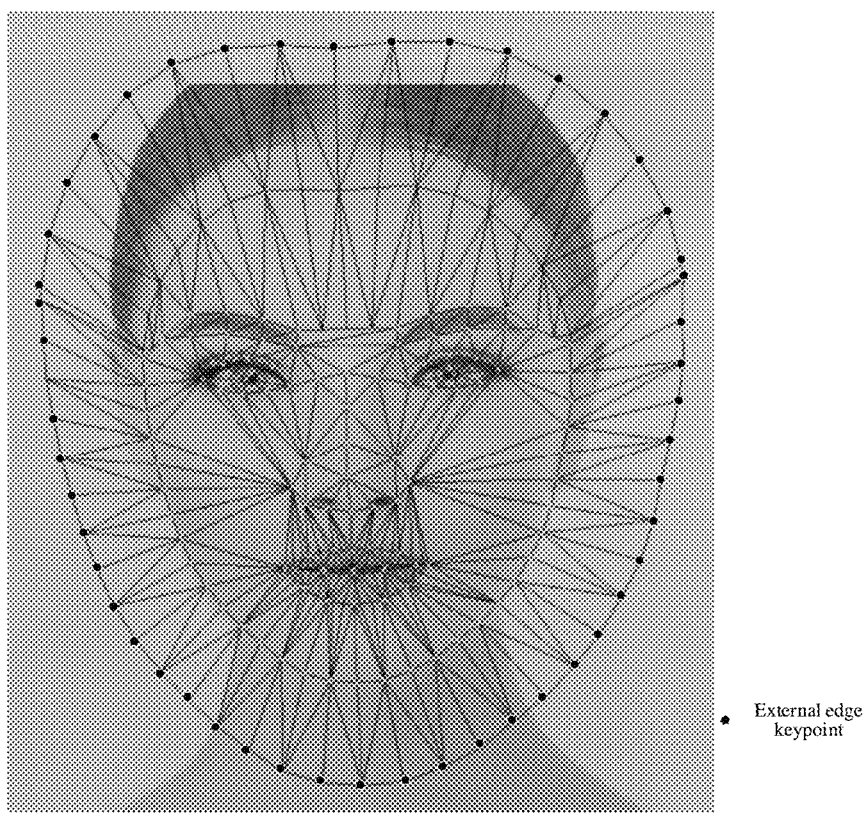

FIG. 2 is a schematic diagram of deformation regions in an image processing method according to embodiments of the disclosure. FIG. 3A to FIG. 3C are schematic diagrams of face keypoints in an image processing method according to embodiments of the disclosure. With reference to FIG. 2 and FIG. 3A to FIG. 3C, in a first aspect, a keypoint of an organ included in a facial region is specifically a keypoint of at least one of the following organs included in the facial region: eyebrows, eyes, nose, and mouth. In some implementations, keypoint information of an organ includes center keypoint information of the organ and/or contour keypoint information of the organ. Taking an example of the organ being an eye, keypoint information of the eye may include center keypoint information of the eye and contour keypoint information of the eye. Taking another example of the organ being an eyebrow, keypoint information of the eyebrow may include contour keypoint information of the eyebrow. In this embodiment, keypoint information of organs in the facial region is first obtained by detection with a facial keypoint detection algorithm.

In a second aspect, information of a first group of contour points below eyes in the facial region is obtained through a facial keypoint detection algorithm, the first group of contour points is shown as keypoint 0 to keypoint 32 in FIG. 3A, and the first group of contour keypoints may also be indicated by the solid dots "•" shown in FIG. 3B. In some embodiments, a small number of M1 contour points, such as 5 contour points, in a region below the eyes in the facial region are obtained through the facial keypoint detection algorithm; and then, for the M1 contour points, M2 contour points are obtained by means of curve interpolation, and the M1 contour points and the M2 contour points serve as the first group of contour points.

The facial keypoint detection algorithm may be any face recognition algorithm.

In a third aspect, keypoint information of a forehead region is obtained. As an example, information of at least three keypoints in the forehead region of the facial region is determined based on a preset parameter. Taking the determination of information of three keypoints as an example, keypoint 1 corresponds to a keypoint located on the midline of the forehead region, and is recorded as the first keypoint, and keypoint 2 and keypoint 3 are located on two sides of keypoint 1, respectively. Curve fitting is performed based on keypoints 4 and 5 (for example, keypoint 0 and keypoint 32 in FIG. 3A) located on the two ends in the first group of contour points and keypoints 1, 2 and 3 to obtain curve fitting keypoint information. Interpolation processing is performed on the curve fitting keypoint information based on a curve interpolation algorithm to obtain information of a second group of contour points matching the forehead region.

So far, keypoint information of the edge of the facial region is obtained by combining the information of the first group of contour points and the information of the second group of contour points. With reference to FIG. 2, keypoints corresponding to the keypoint information of the edge of the facial region are located at all positions of the edge of the facial region, i.e., covering the entire edge of the facial region.

In some embodiments, obtaining the external edge keypoint information based on the keypoint information of the edge of the facial region includes: determining a relative position relationship between the keypoint information of the edge of the facial region and a center point of the facial region, where the relative position relationship includes a distance between a keypoint of the edge of the facial region and the center point of the facial region, and a direction of the keypoint of the edge of the facial region with respect to the center point of the facial region; and extending, based on the relative position relationship, a keypoint of a first edge toward an outside of the facial region by a preset distance to obtain an external edge keypoint corresponding to the keypoint of the first edge, where the keypoint of the first edge is any one of keypoints of the edge of the facial region, and the preset distance is related to a distance between the keypoint of the first edge and the center point of the facial region. The greater the distance between the keypoint of the first edge and the center point of the facial region is, the greater the preset distance for the extension is. Conversely, the smaller the distance between the keypoint of the first edge and the center point of the facial region is, the smaller the preset distance for the extension is. Certainly, in other implementations, other keypoints may be selected instead of being limited to the center point of the facial region. For example, a keypoint corresponding to the nose tip of the nose or the like may be selected. This is not limited in this embodiment.

With reference to FIG. 3C, in this embodiment, the obtained keypoints related to the facial region include external edge keypoints in addition to the keypoints located in the facial region. The external edge keypoints are located outside the facial region. It may be understood that a region corresponding to the external edge keypoints includes the facial region and is larger than the facial region. In some embodiments, the number of external edge keypoints is inconsistent with that of the keypoints of the edge of the facial region, that is, the external edge keypoint information may be determined based on the keypoint information of the edge of the facial region. In some other embodiments, the number of external edge keypoints may also be different from the number of keypoints of the edge of the facial region, for example, the number of external edge keypoints may be greater than the number of keypoints of the edge of the facial region. In practical application, after obtaining the external edge keypoints the number of which is consistent with the number of keypoints of the edge of the facial region in the above manner, for example, after determining N1 external edge keypoints, N2 external edge keypoints may be obtained by curve interpolation for the N1 external edge keypoints, and the information of the N1 external edge keypoints and the N2 external edge keypoints serve as external edge keypoint information in this embodiment.

In this embodiment, the purpose of determining the external edge keypoint information is to perform adaptive deformation processing on triangular deformation regions formed by the external edge keypoint information and the keypoint information of the edge of the facial region during image deformation processing, especially during image deformation processing by means of deformation processing of the triangular deformation regions shown in FIG. 2, that is, to perform adaptive deformation processing on a transition region (i.e., a region between the external edge keypoints and the keypoints of the edge of the facial keypoints) associated with the facial region, so as to obtain a better image deformation effect and make the facial fusion effect more natural. Moreover, the function of making the number of the external edge keypoints greater than the number of keypoints of the edge of the facial region is to reduce the areas of the triangular deformation regions in the transition region (i.e., the region between the external edge keypoints and the keypoints of the edge of the facial keypoints), thereby improving the deformation processing accuracy and improving the deformation effect.

In the related art, on the one hand, the recognition of facial keypoints only identifies sparse keypoints of organs in the face. Based on this, in the embodiments of the disclosure, keypoints are added by means of interpolation, for example, adding several keypoints in the eyebrow center region. On the other hand, the existing facial keypoint recognition only identifies some keypoints below the eyes of the face. With reference to FIG. 3A, in the facial keypoint recognition in this embodiment, multiple keypoints are added in the forehead region, and the added keypoints correspond to the position of the forehead or the hairline, so that the forehead region or hairline is adjusted based on the keypoints of the forehead.

As an example, as shown in FIG. 2, the number of keypoints corresponding to the obtained keypoint information may be 106.

In some optional embodiments of the disclosure, with regard to operation 102, determining the plurality of deformation regions based on the keypoint information includes: determining the plurality of deformation regions based on any three adjacent keypoints corresponding to the keypoint information. Please refer to FIG. 2 for details. In this embodiment, image deformation processing is performed on the target region based on determined triangular deformation regions.

Since the keypoint information related to the facial region in this embodiment includes external edge keypoint information, the triangular deformation regions corresponding to the external edge region may be determined based on the external edge keypoints and the contour keypoints corresponding to the facial region, that is, the deformation region in this embodiment includes a deformation region corresponding to the transition region outside the facial region shown in FIG. 2. Therefore, when deformation processing is performed based on the deformation regions in the facial region, adaptive deformation processing is correspondingly performed on the deformation region outside the facial region, thereby avoiding the occurrence of holes in the image due to the compression of the facial region or the overlapping of pixels in the image due to the stretching of the facial region.

By means of the technical solution of the embodiments of the disclosure, a deformation region on the external edge of a facial region is determined by determining keypoints of the external edge of the facial region, so as to facilitate adaptive deformation processing of the external edge of the facial region during the process of performing deformation processing on the facial region, thereby avoiding the occurrence of holes or pixel overlapping in the image caused by the deformation processing of the facial region, and improving the image processing effect.

In some optional embodiments of the disclosure, performing image deformation processing on the facial region based on at least part of the plurality of deformation regions includes: determining a first target region to be processed in the facial region; determining a deformation region corresponding to the first target region from the plurality of deformation regions based on keypoint information corresponding to the first target region; and performing image deformation processing on the deformation region corresponding to the first target region.

In this embodiment, a target region requiring deformation processing in the facial region is determined, and the target region includes at least one of: an eye region, a nose region, a mouth region, a chin region, a philtrum region, a forehead region, a cheek region, or the like. Then, for different target regions, deformation regions corresponding to the target regions are determined, and deformation processing is performed on the deformation regions to implement deformation processing of the target regions, thereby generating a second image. Determining, for different target regions, the deformation regions corresponding to the target regions includes: determining keypoint information corresponding to the target regions, and determining all deformation regions including the keypoint information from the plurality of deformation regions. For example, if the target region is an eyebrow region, all keypoints corresponding to the eyebrow region are determined, and deformation regions including all the keypoints serve as deformation regions requiring deformation processing.

As a first implementation, the first target region is an eye region; the eye region includes a left eye region and/or a right eye region; determining the deformation region corresponding to the first target region from the plurality of deformation regions based on the keypoint information corresponding to the first target region includes: determining a first group of deformation regions corresponding to the left eye region from the plurality of deformation regions based on keypoint information corresponding to the left eye region, and/or determining a second group of deformation regions corresponding to the right eye region from the plurality of deformation regions based on keypoint information corresponding to the right eye region; and performing image deformation processing on the deformation region corresponding to the first target region includes: performing image deformation processing on the first group of deformation regions and/or the second group of deformation regions, where an image deformation direction of the first group of deformation regions is opposite to an image deformation direction of the second group of deformation regions so as to increase or decrease a distance between the left eye region and the right eye region.

In this embodiment, the first group of deformation regions and the second group of deformation regions are all deformation regions including keypoints of the eye region. This embodiment is used for adjusting the position of the eye region in the facial region. If the facial region includes two eye regions, that is, a left eye region and a right eye region, it may be understood as adjusting the distance between the left eye and the right eye; if the facial region includes only one eye region, such as a side face scenario, it may be understood as adjusting the position of the eye region in the facial region. In practical application, image deformation may be performed on the first group of deformation regions and the second group of deformation regions in opposite image deformation directions, for example, determining a connecting line between the center point of the left eye and the center point of the right eye, and determining the midpoint of the connecting line. If the first group of deformation regions and the second group of deformation regions are separately moved towards the midpoint of the connecting line, the distance between the left eye region and the right eye region is correspondingly reduced, or if the first group of deformation regions and the second group of deformation regions are separately moved in a direction away from the midpoint of the connecting line, the distance between the left eye region and the right eye region is correspondingly increased.

As a second implementation, the first target region is an eye corner region; the eye corner region includes an eye corner region of the left eye and/or an eye corner region of the right eye; determining the deformation region corresponding to the first target region from the plurality of deformation regions based on the keypoint information corresponding to the first target region includes: determining a third group of deformation regions corresponding to the eye corner region of the left eye from the plurality of deformation regions based on keypoint information corresponding to the eye corner region of the left eye, and/or determining a fourth group of deformation regions corresponding to the eye corner region of the right eye from the plurality of deformation regions based on keypoint information corresponding to the eye corner region of the right eye; and performing image deformation processing on the deformation region corresponding to the first target region includes: stretching or compressing the third group of deformation regions and/or the fourth group of deformation regions in a first specific direction to adjust a position of an eye corner in the left eye region and/or a position of an eye corner in the right eye region.

In this embodiment, the third group of deformation regions is all deformation regions including keypoints corresponding to the eye corner region of the left eye, and the fourth group of deformation regions is all deformation regions including keypoints corresponding to the eye corner region of the right eye. The eye corner may be an inner eye corner and/or an outer eye corner of the eye region. The inner eye corner and the outer eye corner are a relative concept. For example, if the midpoint of the connecting line between the center point of the left eye and the center point of the right eye is used as a reference, the so-called inner eye corner refers to an eye corner close to the midpoint of the connecting line, and the outer eye corner refers to an eye corner distant from the midpoint of the connecting line. This embodiment is used for adjusting the position of the eye corner in the facial region, or it may be understood as adjusting the size of the eye corner region of the eye. In practical application, keypoints of the inner eye corner or outer eye corner to be adjusted may be determined, deformation regions including the keypoints may be determined, and the deformation regions may be moved toward the midpoint of the connecting line, or moved away from the midpoint of the connecting line. Exemplarily, the first specific direction is a direction toward the midpoint of the connecting line, or the first specific direction is a direction away from the midpoint of the connecting line.

As a third implementation, the first target region is an eye region; the eye region includes a left eye region and/or a right eye region; determining the deformation region corresponding to the first target region from the plurality of deformation regions based on the keypoint information corresponding to the first target region includes: determining a fifth group of deformation regions corresponding to the left eye region from the plurality of deformation regions based on keypoint information corresponding to the left eye region, and/or determining a sixth group of deformation regions corresponding to the right eye region from the plurality of deformation regions based on keypoint information corresponding to the right eye region; and performing image deformation processing on the deformation region corresponding to the first target region includes: performing deformation processing on the fifth group of deformation regions so that a contour keypoint of the left eye region is rotated with respect to a center keypoint of the left eye region, where a rotation angle of the contour keypoint of the left eye region satisfies a first set angle, and/or performing deformation processing on the sixth group of deformation regions so that a contour keypoint of the right eye region is rotated with respect to a center keypoint of the right eye region, where a rotation angle of the contour keypoint of the right eye region satisfies a second set angle.

In this embodiment, the fifth group of deformation regions is all deformation regions including keypoints of the left eye region, and the sixth group of deformation regions includes all deformation regions including keypoints of the right eye region. This embodiment is used for adjusting the angle of the eye region. It may be understood as adjusting the relative angles between the eye and other organs on the face, such as the relative angle between the eye and the nose. In practical applications, it is performed by rotating a specific angle clockwise or counterclockwise by using the center point of the eye as the rotation center. As an example, deformation processing is performed on the deformation regions corresponding to the eye region by a preset rotation matrix, so that contour keypoints of the eye region are rotated with respect to the center keypoint of the eye region. The rotation angle of the contour keypoints of the left eye region with respect to the center keypoint of the left eye region satisfies a first set angle, and the rotation angle of the contour keypoints of the right eye region with respect to the center keypoint of the right eye region satisfies a second set angle; the rotation direction of the left eye region and the rotation direction of the right eye region may be opposite; the values of the first set angle and the second set angle may be the same or different.

As a fourth implementation, the first target region is a nose region; determining the deformation region corresponding to the first target region from the plurality of deformation regions based on the keypoint information corresponding to the first target region includes: determining a seventh group of deformation regions corresponding to the nose region from the plurality of deformation regions based on keypoint information corresponding to the nose region; and performing image deformation processing on the deformation region corresponding to the first target region includes: stretching or compressing the seventh group of deformation regions in a second specific direction to lengthen or shorten the nose region.

In this embodiment, the seventh group of deformation regions is all deformation regions including keypoints of the nose. This embodiment is used for adjusting the length or height of the nose region, which may be understood as adjusting the length of the nose region or adjusting the height of the nose. In practical application, the seventh group of deformation regions may be stretched or compressed in a second specific direction to lengthen or shorten the nose region. As some implementations, the second specific direction is a length direction of the facial region. For example, a straight line formed by the midpoint of the connecting line between the two eyebrow centers in the facial region, the center point of the nose, and the center point of the lips serves as the length direction of the facial region. Then, stretching the seventh group of deformation regions from the center of the nose region toward the outside of the nose region in the length direction lengthens the nose region, and compressing the seventh group of deformation regions from the outside of the nose region toward the center of the nose region in the length direction shortens the nose region.

As another implementation, the second specific direction may also be a direction perpendicular to the facial region and away from the facial region, and then the height of the nose region is adjusted according to the second specific direction. In practical application, this implementation is applicable to a scenario in which a face in an image is a side face, that is, in a scenario in which a face in an image is a side face, a deflection parameter for the facial region is determined, a second specific direction is determined based on the deflection parameter, i.e., a direction corresponding to the nose height is determined based on the deflection of the face, and then deformation processing is performed on the seventh group of deformation regions corresponding to the nose region according to the second specific direction to increase or decrease the nose height.

As a fifth implementation, the first target region is a nosewing region; determining the deformation region corresponding to the first target region from the plurality of deformation regions based on the keypoint information corresponding to the first target region includes: determining an eighth group of deformation regions corresponding to the nosewing region from the plurality of deformation regions based on keypoint information corresponding to the nosewing region; and performing image deformation processing on the deformation region corresponding to the first target region includes: compressing or stretching the eighth group of deformation regions in a third specific direction to narrow or widen the nosewing region.

In this embodiment, the eighth group of deformation regions is all deformation regions including keypoints corresponding to the nosewing region, and the nosewing regions refer to regions on both sides of the nose tip. This embodiment is used for adjusting the width of the nosewing region, which may be understood as adjusting the width of the nosewings. In practical application, keypoints corresponding to the nosewing region may be determined, deformation regions including the keypoints may be determined, and the deformation regions may be compressed or stretched in a third specific direction to narrow or widen the nosewing region, where the third specific direction is the width direction of the facial region, and the width direction of the facial region is perpendicular to the length direction of the facial region.

As a sixth implementation, the first target region is a chin region or a philtrum region; determining the deformation region corresponding to the first target region from the plurality of deformation regions based on the keypoint information corresponding to the first target region includes: determining a ninth group of deformation regions corresponding to the chin region or the philtrum region from the plurality of deformation regions based on keypoint information corresponding to the chin region or the philtrum region; and performing image deformation processing on the deformation region corresponding to the first target region includes: compressing or stretching the ninth group of deformation regions in a fourth specific direction to shorten or lengthen the chin region or the philtrum region.

In this embodiment, the ninth group of deformation regions is all deformation regions including chin keypoints or philtrum keypoints. This embodiment is used for performing adjustment on the length of the chin region or the philtrum region, which may be understood as adjusting the length of the chin region or the philtrum region. The chin region refers to a lower jaw region; and the philtrum region refers to a region between the nose and the mouth. In practical application, the ninth group of deformation regions may be compressed or stretched in the fourth specific direction to shorten or lengthen the chin region or the philtrum region. The fourth specific direction is the length direction of the facial region.

As a seventh implementation, the first target region is a mouth region; determining the deformation region corresponding to the first target region from the plurality of deformation regions based on the keypoint information corresponding to the first target region includes: determining a tenth group of deformation regions corresponding to the mouth region from the plurality of deformation regions based on keypoint information corresponding to the mouth region; and performing image deformation processing on the deformation region corresponding to the first target region includes: performing compressing processing on the tenth group of deformation regions in a direction from an edge of the mouth region to a center of the mouth region, or performing stretching processing on the tenth group of deformation regions in a direction from the center of the mouth region to the edge of the mouth region.

In this embodiment, the tenth group of deformation regions is all deformation regions including keypoints of the mouth. This embodiment is used for adjusting the size of the mouth region, which may be understood as enlargement processing of the mouth region or reduction processing of the mouth region. In practical application, keypoints corresponding to the mouth region may be determined, all deformation regions including the keypoints may be determined as the tenth group of deformation regions, and for the deformation regions, compressing processing may be performed on the tenth group of deformation regions in a direction from an edge of the mouth region to a center of the mouth region, or stretching processing may be performed on the tenth group of deformation regions in a direction from the center of the mouth region to the edge of the mouth region.

As an eighth implementation, determining the deformation region corresponding to the first target region from the plurality of deformation regions based on the keypoint information corresponding to the first target region includes: determining an eleventh group of deformation regions corresponding to the facial region from the plurality of deformation regions based on the keypoint information of the edge of the facial region; and performing image deformation processing on the deformation region corresponding to the first target region includes: performing compressing processing on the eleventh group of deformation regions in a direction from the edge of the facial region to a midline of the facial region, or performing stretching processing on the eleventh group of deformation regions in a direction from the midline of the facial region to the edge of the facial region.

In this embodiment, the eleventh group of deformation regions is all deformation regions including keypoints of the edge of the facial region. For the keypoints of the edge of the facial region, reference may be made to at least some keypoints in the first group of contour keypoints and/or the second group of contour keypoints shown in FIG. 3B. This embodiment is used for adjusting the width of the facial region, which may be understood as "face thinning" or "face fattening" processing. In practical application, compressing processing may be performed on the eleventh group of deformation regions in a direction from the edge of the facial region to the midline of the facial region, or stretching processing may be performed on the eleventh group of deformation regions in a direction from the midline of the facial region to the edge of the facial region. Exemplarily, the midline of the facial region includes a center point of the facial region (a keypoint corresponding to the nose tip), then compressing processing may be performed on the eleventh group of deformation regions in a direction from the edge of the facial region to the center point of the facial region, or stretching processing may be performed on the eleventh group of deformation regions in a direction from the center point of the facial region to the edge of the facial region.

In some embodiments, the deformation ratios for deformation regions corresponding to keypoints at different positions are different. Exemplarily, deformation regions corresponding to a keypoints included in a cheek region have the largest deformation ratios, and the deformation ratios of deformation regions corresponding to other regions may be gradually reduced. For example, as shown in FIG. 3A, the deformation ratios of deformation regions corresponding to keypoints near keypoint 0, keypoint 16, and keypoint 32 are the smallest, and the deformation ratios of deformation regions corresponding to keypoints near keypoint 8 and keypoint 24 are the largest, so that the deformation effect (for example, a face thinning effect or a face fattening effect) is more natural.

As a ninth implementation, the first target region is a forehead region; determining the deformation region corresponding to the first target region from the plurality of deformation regions based on the keypoint information corresponding to the first target region includes: determine a twelfth group of deformation regions corresponding to the forehead region from the plurality of deformation regions based on keypoint information of the forehead region; and performing image deformation processing on the deformation region corresponding to the first target region includes: performing stretching or compressing processing on the twelfth group of deformation regions in a fifth specific direction to raise or lower a hairline of the facial region, where the fifth specific direction is a direction in which a keypoint of the forehead region points to an eyebrow center closest to the keypoint of the forehead region, or the fifth specific direction is a direction in which the keypoint of the forehead region gets away from the eyebrow center closest to the keypoint of the forehead region.

In this embodiment, the twelfth group of deformation regions is all deformation regions including keypoints of the forehead region. For the approach to determine the keypoints of the forehead region, reference may be made to the foregoing, and details are not described herein again. This embodiment is used for adjusting the width of the forehead region, which may be understood as adjusting the relative height of the hairline in the facial region. In practical application, keypoints of the forehead region may be determined, and all deformation regions including the keypoints are determined from the plurality of deformation regions as the twelfth group of deformation regions, for example, the triangular deformation regions corresponding to the forehead region and the triangular deformation regions corresponding to the external edge region outside the forehead region shown in FIG. 2 serve as the twelfth group of deformation regions in this embodiment; and stretching or compressing processing is performed on the twelfth group of deformation regions in a fifth specific direction to raise or lower the hairline of the facial region. If the face in the image includes two eyebrows, for a certain feature point corresponding to the forehead region, an eyebrow center closest to the feature point may be first determined, and a direction involving the feature point and the eyebrow center may be determined and used as the fifth specific direction; for three keypoints included in a deformation region, the fifth specific directions corresponding to the keypoints are respectively determined, and deformation processing is performed on the deformation region according to the fifth specific direction corresponding to each feature point, specifically, the three keypoints in the deformation region are moved according to the corresponding fifth specific directions.

In view of the above, the image processing method in this embodiment implements: 1. adjustment of the hairline, that is, the position of the hairline is adjusted to raise or lower the hairline; 2. adjustment of the length of the nose region, that is, the length of the nose is adjusted to lengthen or shorten the nose; 3. adjustment of the nosewing region, that is, the width of the nosewings is adjusted; 4. adjustment of the philtrum region, that is, the length of the philtrum region is adjusted to lengthen or shorten the philtrum region; 5. adjustment of the mouth shape, that is, the size of the mouth is adjusted; 6. adjustment of the chin region, that is, the length of the chin region is adjusted to lengthen or shorten the chin region; 7. adjustment of the face shape, that is, the face contour is adjusted to narrow or widen the face contour, for example, "face thinning"; 8. adjustment of the distance between the eyes, that is, the distance between the left eye and the right eye is adjusted; 9. adjustment of the eye angles, that is, the relative angles of the eyes are adjusted; 10, adjustment of the positions of the eye corners, that is, the positions of the eye corners are adjusted for "eye corner extension" to enlarge the eyes; and 11. adjustment of the height of the nose in a side face scenario, that is, "nose augmentation" on the side face is implemented.

Figure 4:
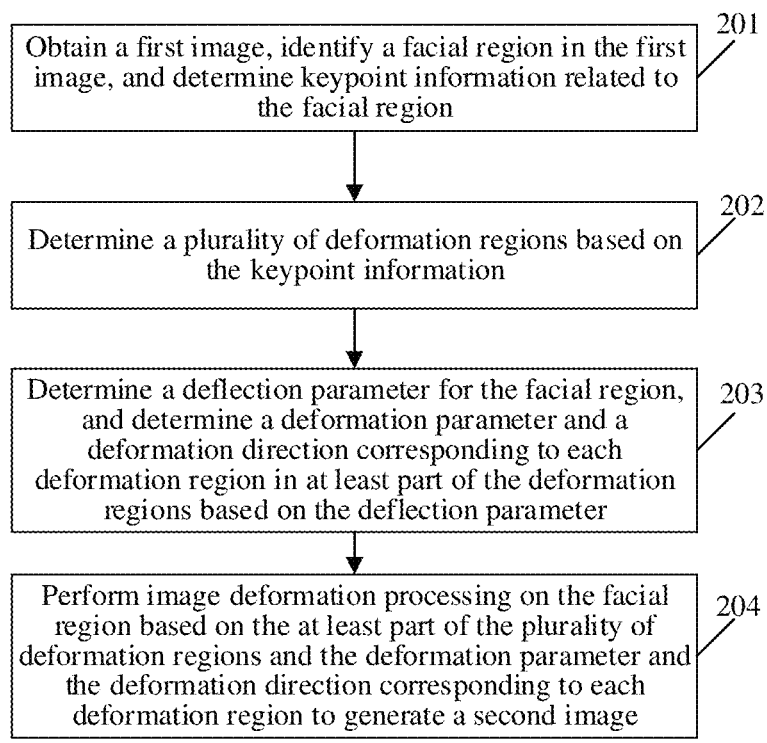
FIG. 4 is another schematic flowchart of an image processing method according to embodiments of the disclosure.

The embodiments of the disclosure further provide an image processing method. FIG. 4 is another schematic flowchart of an image processing method according to embodiments of the disclosure. As shown in FIG. 4, the method includes the following operations.

At operation 201, a first image is obtained, a facial region in the first image is identified, and keypoint information related to the facial region is determined, where the keypoint information includes keypoint information of the facial region and external edge keypoint information, and a region corresponding to the external edge keypoint information includes the facial region and is larger than the facial region.

At operation 202, a plurality of deformation regions is determined based on the keypoint information.

At operation 203, a deflection parameter for the facial region is determined, and a deformation parameter and a deformation direction corresponding to each deformation region in at least part of the deformation regions are determined based on the deflection parameter.

At operation 204, image deformation processing is performed on the facial region based on the at least part of the plurality of deformation regions and the deformation parameter and the deformation direction corresponding to each deformation region to generate a second image.

For descriptions of operation 201 and operation 202 in this embodiment, reference may be specifically made to the descriptions of operation 101 and operation 102 in the foregoing embodiment, and details are not described herein again.

It may be understood that the foregoing embodiments are mainly directed to a case where the facial region is not deflected. For a case where the facial region is deflected, i.e., a side face scenario, it is necessary to determine a deflection parameter for the facial region first, then determine a deformation parameter and a deformation direction corresponding to each deformation region requiring deformation processing according to the deflection parameter, and perform deformation processing on the deformation region according to the determined deformation parameter and deformation direction.

In some optional embodiments of the disclosure, determining the deflection parameter for the facial region includes: determining a left edge keypoint, a right edge keypoint, and a center keypoint of any region in the facial region, where the region includes at least one of: a cheek region, a nose region, or a mouth region; determining a first distance between the left edge keypoint and the center keypoint, and determining a second distance between the right edge keypoint and the center keypoint; and determining the deflection parameter for the facial region based on the first distance and the second distance.

As an example, taking a nose region as an example, a center point of the nose (such as the nose tip), a leftmost nosewing keypoint, and a rightmost nosewing keypoint are separately determined, a first distance between the leftmost nosewing keypoint and the center point of the nose is calculated, a second distance between the rightmost nosewing keypoint and the center point of the nose is calculated, and a deflection parameter for the facial region is determined based on the first distance and the second distance. The deformation direction for the first target region in the foregoing embodiments is further adjusted based on the deflection parameter.

Taking deformation processing of the first target region which is a nosewing region as an example, due to the deflection of the facial region, the deformation parameters for the left nosewing region and the right nosewing region are different, and if the first distance is greater than the second distance, the deformation parameter for the left nosewing region is greater than the deformation parameter for the right nosewing region. As an example, the movement ratio of the leftmost nosewing keypoint may be the first distance divided by the distance between the leftmost nosewing keypoint and a nosewing center point, and limited to 0 to 1. Similarly, the movement ratio of the rightmost nosewing keypoint may be the second distance divided by the distance between the rightmost nosewing keypoint and a nosewing center point, and limited to 0 to 1. In this way, the movement distances of nosewing keypoints on both sides change with the deflection of the facial region.

By means of the technical solution of the embodiments of the disclosure, on the one hand, a deformation region on the external edge of a facial region is determined by determining keypoints of the external edge of the facial region, so as to facilitate adaptive deformation processing of the external edge of the facial region during the process of performing deformation processing on the facial region, thereby avoiding the occurrence of holes or pixel overlapping in the image caused by the deformation processing of the facial region, and improving the image processing effect. On the other hand, by forming closed keypoint information of the contour of the facial region, deformation processing of a forehead region of the facial region is implemented. Moreover, by detecting the deflection of the facial region, adjustment of the height of the nose in a side face scenario is implemented.

Figure 5:
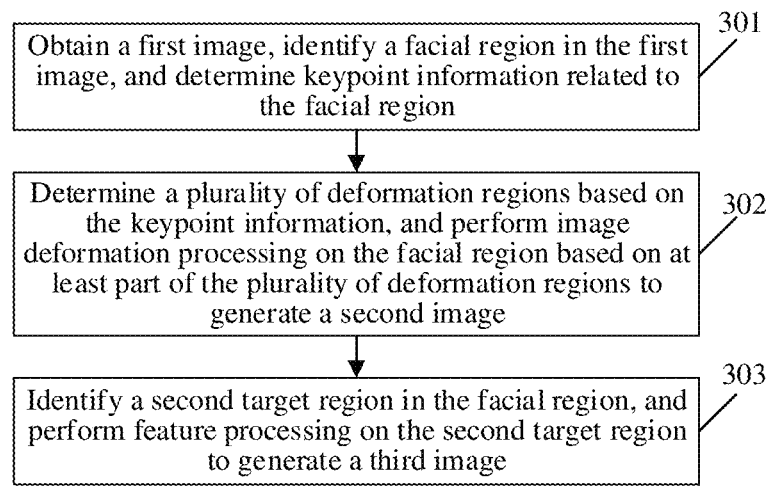
FIG. 5 is still another schematic flowchart of an image processing method according to embodiments of the disclosure.

The embodiments of the disclosure further provide an image processing method. FIG. 5 is still another schematic flowchart of an image processing method according to embodiments of the disclosure. As shown in FIG. 5, the method includes the following operations.

At operation 301, a first image is obtained, a facial region in the first image is identified, and keypoint information related to the facial region is determined, where the keypoint information includes keypoint information of the facial region and external edge keypoint information, and a region corresponding to the external edge keypoint information includes the facial region and is larger than the facial region.

At operation 302, a plurality of deformation regions is determined based on the keypoint information, and image deformation processing is performed on the facial region based on at least part of the plurality of deformation regions to generate a second image.

At operation 303, a second target region in the facial region is identified, and feature processing is performed on the second target region to generate a third image, where the second target region includes at least one of: a periocular region, a nasolabial fold region, a tooth region, an eye region, or a submalar triangle region.

For descriptions of operation 301 and operation 302 in this embodiment, reference may be specifically made to the descriptions of operation 101 and operation 102 in the foregoing embodiment. For the purpose of brevity, details are not described herein again.

In this embodiment, in addition to performing image deformation processing on the facial region based on the deformation regions, feature processing may also be performed based on the image. As some implementations, the feature processing of the image may be processing of pixels in the image, and the feature processing approach may include at least one of: noise reduction processing, Gaussian blur processing, high- and low-frequency processing, mask processing, or the like. If the second target region is a periocular region, the processing of the second target region may specifically be processing of removing a dark circle; if the second target region is a nasolabial fold region, the processing of the second target region may specifically be processing of removing a nasolabial fold; if the second target region is a tooth region, the processing of the second target region may specifically be processing of whitening the teeth; if the second target region is an eye region, the processing of the second target region may specifically be brightness enhancement processing of the eye region; and if the second target region is a submalar triangle region, the processing of the second target region may specifically be processing of enlarging or reducing the submalar triangle region and/or brightness processing of the submalar triangle region, or the like.

For the Gaussian processing approach, Gaussian blur processing may be performed on the second target region, which is equivalent to performing dermabrasion processing on the second target region.

Figure 6:
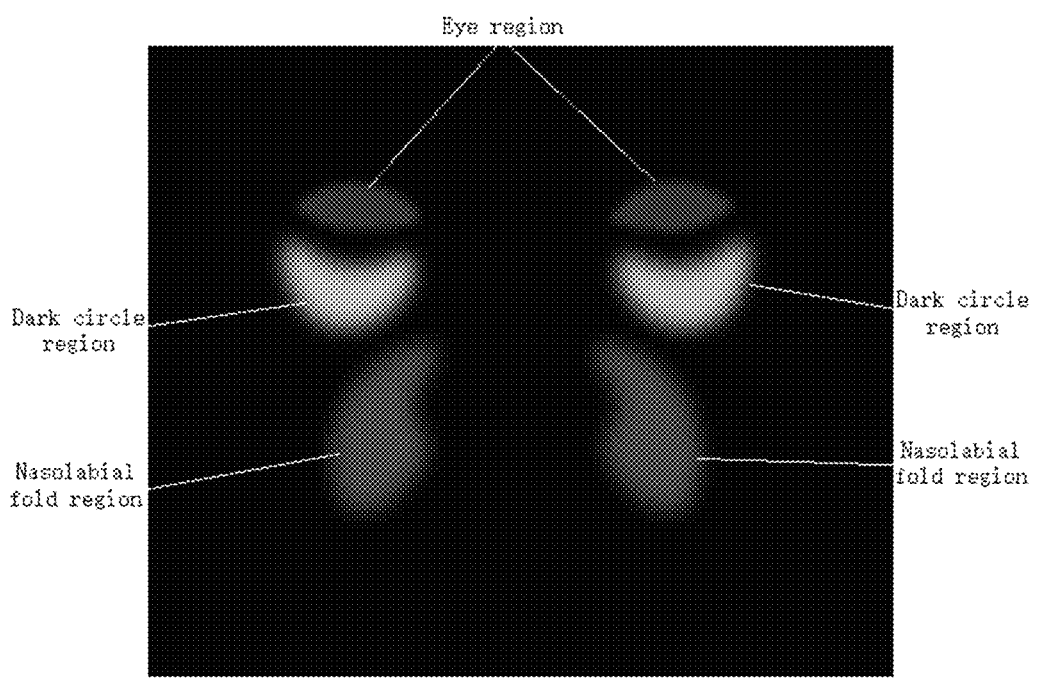
FIG. 6 is a schematic application diagram of image processing according to embodiments of the disclosure.

For the mask processing approach, the second target region is covered with a mask matching the second target region, as shown in FIG. 6, and FIG. 6 shows an example of performing processing on the second target region. Exemplarily, taking the second target region being a periocular region as an example, an eye region is determined first, and a periocular region is determined based on the determined eye region. Generally, the dark circles are located below the eyes, and specifically a region below the eye region may be determined as the second target region (a periocular region). In practical application, a mask corresponding to the periocular region may be preset, and then the periocular region is covered with the mask corresponding to the periocular region to generate a third image. The approach to processing a nasolabial fold region is similar to the approach to processing the periocular region, that is, the nasolabial fold region is determined first, a mask corresponding to the nasolabial fold region is preset, and then the nasolabial fold region is covered with the mask corresponding to the nasolabial fold region to generate a third image.

For processing of a tooth region, a target parameter to be replaced representing a color is determined through a preset color lookup table; and a tooth region is determined, and a parameter corresponding to the tooth region is adjusted as the target parameter, so as to adjust the tooth color.

The processing of an eye region may specifically be the brightness enhancement of the eye region.

Figure 7:
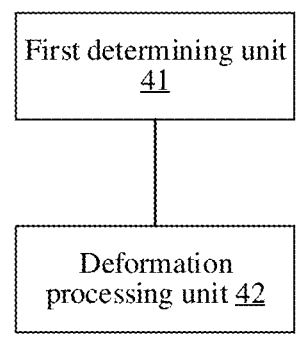
FIG. 7 is a schematic structural composition diagram of an image processing apparatus according to embodiments of the disclosure.

The embodiments of the disclosure further provide an image processing apparatus. FIG. 7 is a schematic structural composition diagram of an image processing apparatus according to embodiments of the disclosure. As shown in FIG. 7, the apparatus includes: a first determining unit 41 and a deformation processing unit 42.

The first determining unit 41 is configured to: obtain a first image, identify a facial region in the first image, and determine keypoint information related to the facial region, where the keypoint information includes keypoint information of the facial region and external edge keypoint information, and a region corresponding to the external edge keypoint information includes the facial region and is larger than the facial region; and determine a plurality of deformation regions based on the keypoint information.

The deformation processing unit 42 is configured to perform image deformation processing on the facial region based on at least part of the plurality of deformation regions to generate a second image.

In some optional embodiments of the disclosure, the keypoint information of the facial region includes keypoint information of an organ of the facial region and keypoint information of an edge of the facial region; the edge of the facial region corresponds to a contour of the facial region; and the keypoint information of the organ includes center keypoint information of the organ and/or contour keypoint information of the organ.

In some optional embodiments of the disclosure, the first determining unit 41 is configured to determine the plurality of deformation regions based on any three adjacent keypoints corresponding to the keypoint information.

In some optional embodiments of the disclosure, the first determining unit 41 is configured to: determine a first target region to be processed in the facial region; and determine a deformation region corresponding to the first target region from the plurality of deformation regions based on keypoint information corresponding to the first target region.

The deformation processing unit 42 is configured to perform image deformation processing on the deformation region corresponding to the first target region.

As a first implementation, the first target region is an eye region; and the eye region includes a left eye region and/or a right eye region.

The first determining unit 41 is configured to determine a first group of deformation regions corresponding to the left eye region from the plurality of deformation regions based on keypoint information corresponding to the left eye region, and/or determine a second group of deformation regions corresponding to the right eye region from the plurality of deformation regions based on keypoint information corresponding to the right eye region.

The deformation processing unit 42 is configured to perform image deformation processing on the first group of deformation regions and/or the second group of deformation regions, where an image deformation direction of the first group of deformation regions is opposite to an image deformation direction of the second group of deformation regions so as to increase or decrease a distance between the left eye region and the right eye region.

As a second implementation, the first target region is an eye corner region; and the eye corner region includes an eye corner region of the left eye and/or an eye corner region of the right eye.

The first determining unit 41 is configured to determine a third group of deformation regions corresponding to the eye corner region of the left eye from the plurality of deformation regions based on keypoint information corresponding to the eye corner region of the left eye, and/or determine a fourth group of deformation regions corresponding to the eye corner region of the right eye from the plurality of deformation regions based on keypoint information corresponding to the eye corner region of the right eye.

The deformation processing unit 42 is configured to stretch or compress the third group of deformation regions and/or the fourth group of deformation regions in a first specific direction to adjust a position of an eye corner in the left eye region and/or a position of an eye corner in the right eye region.

As a third implementation, the first target region is an eye region; and the eye region includes a left eye region and/or a right eye region.

The first determining unit 41 is configured to determine a fifth group of deformation regions corresponding to the left eye region from the plurality of deformation regions based on keypoint information corresponding to the left eye region, and/or determine a sixth group of deformation regions corresponding to the right eye region from the plurality of deformation regions based on keypoint information corresponding to the right eye region.

The deformation processing unit 42 is configured to perform deformation processing on the fifth group of deformation regions so that a contour keypoint of the left eye region is rotated with respect to a center keypoint of the left eye region, where a rotation angle of the contour keypoint of the left eye region satisfies a first set angle, and/or perform deformation processing on the sixth group of deformation regions so that a contour keypoint of the right eye region is rotated with respect to a center keypoint of the right eye region, where a rotation angle of the contour keypoint of the right eye region satisfies a second set angle.

As a fourth implementation, the first target region is a nose region.

The first determining unit 41 is configured to determine a seventh group of deformation regions corresponding to the nose region from the plurality of deformation regions based on keypoint information corresponding to the nose region.

The deformation processing unit 42 is configured to stretch or compress the seventh group of deformation regions in a second specific direction to lengthen or shorten the nose region.

As a fifth implementation, the first target region is a nosewing region.

The first determining unit 41 is configured to determine an eighth group of deformation regions corresponding to the nosewing region from the plurality of deformation regions based on keypoint information corresponding to the nosewing region.

The deformation processing unit 42 is configured to compress or stretch the eighth group of deformation regions in a third specific direction to narrow or widen the nosewing region.

As a sixth implementation, the first target region is a chin region or a philtrum region.

The first determining unit 41 is configured to determine a ninth group of deformation regions corresponding to the chin region or the philtrum region from the plurality of deformation regions based on keypoint information corresponding to the chin region or the philtrum region.

The deformation processing unit 42 is configured to compress or stretch the ninth group of deformation regions in a fourth specific direction to shorten or lengthen the chin region or the philtrum region.

As a seventh implementation, the first target region is a mouth region.

The first determining unit 41 is configured to determine a tenth group of deformation regions corresponding to the mouth region from the plurality of deformation regions based on keypoint information corresponding to the mouth region.

The deformation processing unit 42 is configured to perform compressing processing on the tenth group of deformation regions in a direction from an edge of the mouth region to a center of the mouth region, or perform stretching processing on the tenth group of deformation regions in a direction from the center of the mouth region to the edge of the mouth region.

As an eighth implementation, the first determining unit 41 is configured to determine an eleventh group of deformation regions corresponding to the facial region from the plurality of deformation regions based on the keypoint information of the edge of the facial region.

The deformation processing unit 42 is configured to perform compressing processing on the eleventh group of deformation regions in a direction from the edge of the facial region to a center point of the facial region, or perform stretching processing on the eleventh group of deformation regions in a direction from the center point of the facial region to the edge of the facial region.

As a ninth implementation, the first target region is a forehead region.

The first determining unit 41 is configured to determine a twelfth group of deformation regions corresponding to the forehead region from the plurality of deformation regions based on keypoint information corresponding to the forehead region.

The deformation processing unit 42 is configured to perform stretching or compressing processing on the twelfth group of deformation regions in a fifth specific direction to raise or lower a hairline of the facial region, where the fifth specific direction is a direction in which a keypoint of the forehead region points to an eyebrow center closest to the keypoint of the forehead region, or the fifth specific direction is a direction in which the keypoint of the forehead region gets away from the eyebrow center closest to the keypoint of the forehead region.

Optionally, the first determining unit 41 is configured to: determine at least three keypoints of the forehead region; and determine the keypoint information of the forehead region based on the at least three keypoints and information of a first group of contour points below eyes in the facial region.

In some implementations, a first keypoint of the at least three keypoints is located on a midline of the forehead region; and a second keypoint and a third keypoint of the at least three keypoints are located on two sides of the midline.

In some implementations, the first determining unit 41 is configured to: perform curve fitting based on keypoints located at two ends in the first group of contour points below the eyes in the facial region and the at least three keypoints to obtain curve fitting keypoint information; and perform interpolation processing on the curve fitting keypoint information based on a curve interpolation algorithm to obtain the keypoint information corresponding to the forehead region.

In some optional embodiments of the disclosure, the first determining unit 41 is configured to: obtain the keypoint information of the organ of the facial region and the keypoint information of the edge of the facial region by performing detection on the facial region through a facial keypoint detection algorithm; and obtain the external edge keypoint information based on the keypoint information of the edge of the facial region.

In some optional embodiments of the disclosure, the first determining unit 41 is configured to: obtain the information of the first group of contour points below the eyes in the facial region; and determine information of a second group of contour points corresponding to the forehead region, and determine the keypoint information of the edge of the facial region based on the information of the first group of contour points and the information of the second group of contour points.

In some optional embodiments of the disclosure, the first determining unit 41 is configured to: determine a relative position relationship between the keypoint information of the edge of the facial region and the center point of the facial region, where the relative position relationship includes a distance between a keypoint of the edge of the facial region and the center point of the facial region, and a direction of the keypoint of the edge of the facial region with respect to the center point of the facial region; and extend, based on the relative position relationship, a keypoint of a first edge toward an outside of the facial region by a preset distance to obtain an external edge keypoint corresponding to the keypoint of the first edge, where the keypoint of the first edge is any one of keypoints of the edge of the facial region, and the preset distance is related to a distance between the keypoint of the first edge and the center point of the facial region.

Figure 8:
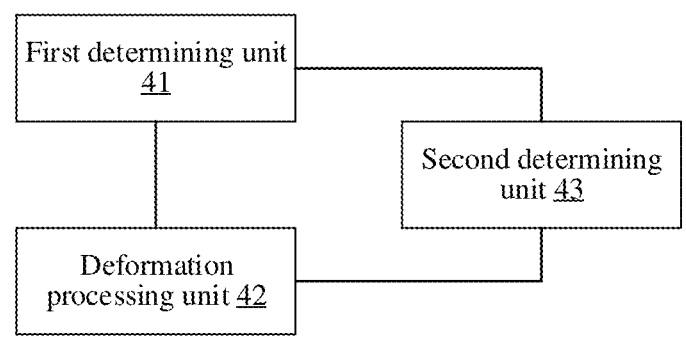
FIG. 8 is another schematic structural composition diagram of an image processing apparatus according to embodiments of the disclosure.

In some optional embodiments of the disclosure, as shown in FIG. 8, the apparatus further includes a second determining unit 43, configured to determine a deflection parameter for the facial region, and determine a deformation parameter and a deformation direction corresponding to each deformation region in the at least part of the deformation regions based on the deflection parameter, so that image deformation processing is performed on the deformation region according to the corresponding deformation parameter and deformation direction.

In some implementations, the second determining unit 43 is configured to: determine a left edge keypoint, a right edge keypoint, and a center keypoint of any region in the facial region, where the region includes at least one of: a cheek region, a nose region, or a mouth region; determine a first distance between the left edge keypoint and the center keypoint, and determine a second distance between the right edge keypoint and the center keypoint; and determine the deflection parameter for the facial region based on the first distance and the second distance.

Figure 9:
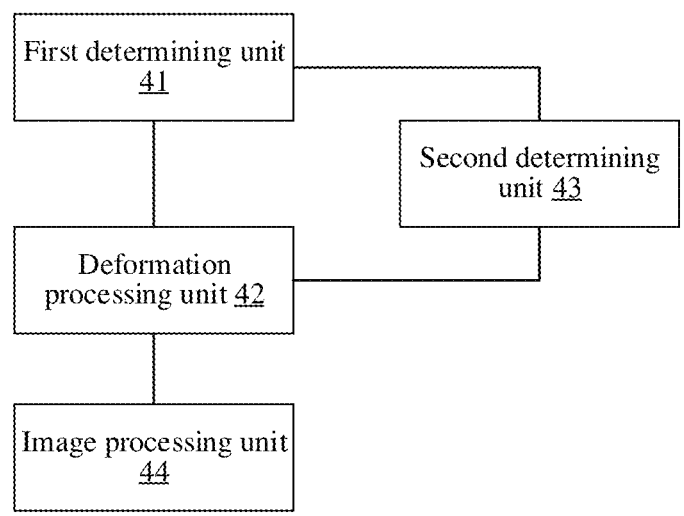
FIG. 9 is still another schematic structural composition diagram of an image processing apparatus according to embodiments of the disclosure.

In some optional embodiments of the disclosure, as shown in FIG. 9, the apparatus further includes an image processing unit 44, configured to identify a second target region in the facial region, and perform feature processing on the second target region to generate a third image, where the second target region includes at least one of: a periocular region, a nasolabial fold region, a tooth region, an eye region, or a submalar triangle region.

In the embodiments of the disclosure, the first determining unit 41, the deformation processing unit 42, the second determining unit 43, and the image processing unit 44 in the apparatus all may be implemented by a Center Processing Unit (CPU), a Digital Signal Processor (DSP), a Microcontroller Unit (MU), or a Field-Programmable Gate Array (FPGA) in practical application.

It may be noted that: when performing image processing, the image processing apparatus provided by the foregoing embodiments is exemplified by division of the various program modules above. In practical application, the processing above may be assigned to different program modules for implementation as needed. That is, the internal structure of the apparatus is divided into different program modules to implement all or some of the processing described above. In addition, the image processing apparatus provided by the foregoing embodiments and the image processing method embodiments relate to the same concept. Please refer to the method embodiments for the specific implementation process of the image processing apparatus. Details are not described herein again.

Figure 10:
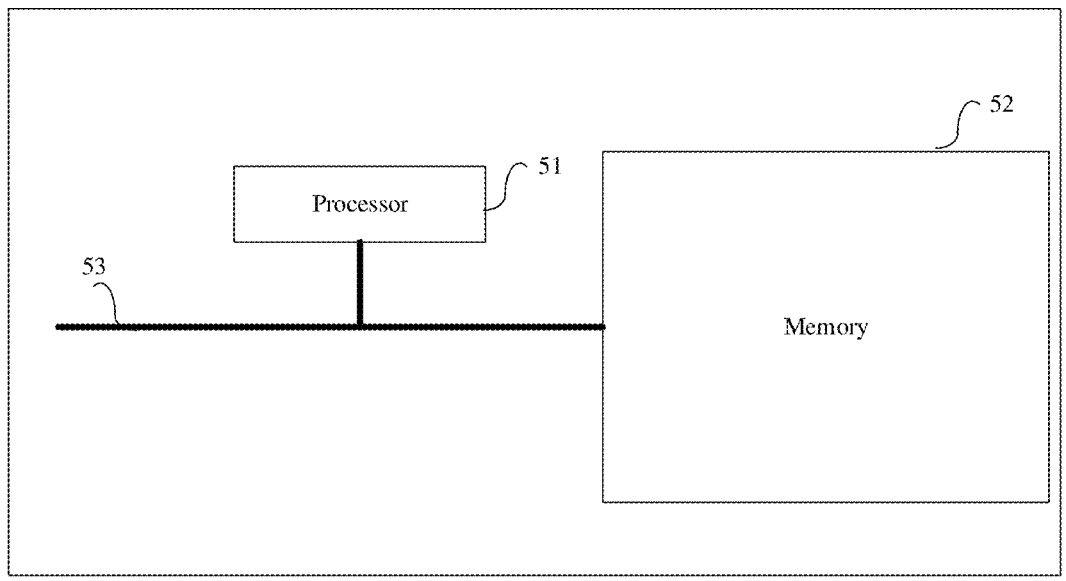
FIG. 10 is a schematic structural hardware composition diagram of an image processing apparatus according to embodiments of the disclosure.

The embodiments of the disclosure further provide an image processing apparatus. FIG. 10 is a schematic structural hardware composition diagram of an image processing apparatus according to embodiments of the disclosure. As shown in FIG. 10, the image processing apparatus includes a memory 52, a processor 51, and a computer program stored on the memory 52 and executable on the processor 51. When the processor 51 executes the program, the operations of the method according to the embodiments of the disclosure are implemented.

It may be understood that various components in the image processing apparatus may be coupled together through a bus system 53. It may be understood that the bus system 53 is used for implementing connection and communication between the components. In addition to a data bus, the bus system 53 further includes a power bus, a control bus, and a status signal bus. However, for clarity, various buses are labeled as the bus system 53 in FIG. 10.

It may be understood that the memory 52 may be a volatile memory or a non-volatile memory, or may include both a volatile memory and a non-volatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk, or a Compact Disc Read-Only Memory (CD-ROM). The magnetic surface memory may be a magnetic-disk memory or a magnetic tape memory. The volatile memory may be a Random Access Memory (RAM), which acts as an external cache. By way of example but not limitation, RAMs in many forms are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 52 described in the embodiments of the disclosure is aimed at including, but not limited to, these and any other suitable types of memory.

The method disclosed by the foregoing embodiments of the disclosure may be applied to the processor 51, or may be implemented by the processor 51. The processor 51 may be an integrated circuit chip and has a signal processing capability. During implementation, the operations of the foregoing method may be completed by means of an integrated logic circuit of hardware in the processor 51 or instructions in the form of software. The processor 51 may be a general-purpose processor, a DSP, or other programmable logic device, discrete gate or transistor logic device, discrete hardware component or the like. The processor 51 may implement or execute the methods, the operations, and the logic block diagrams disclosed in the embodiments of the disclosure. The general-purpose processor may be a microprocessor or any conventional processor. The operations of the methods disclosed with reference to the embodiments of the disclosure may be directly implemented by a hardware decoding processor, or implemented by a combination of hardware and software modules in a coding processor. The software module may be located in a storage medium which is located in the memory 52. The processor 51 reads information in the memory 52 and implements the operations of the foregoing method in combination with its hardware.

In an exemplary embodiment, the image processing apparatus may be implemented by one or more Application Specific Integrated Circuits (ASICs), a DSP, a Programmable Logic Device (PLD), a Complex Programmable Logic Device (CPLD), an FPGA, a general-purpose processor, a controller, an MCU, a microprocessor, or other electronic elements, to perform the foregoing method.

The embodiments of the disclosure also provide a computer-readable storage medium having a computer program stored thereon, where when the program is executed by a processor, operations of the method according to the embodiments of the disclosure are implemented.

It may be understood that the disclosed apparatuses and method in the embodiments provided in the disclosure may be implemented by means of other modes. The device embodiments described above are merely exemplary. For example, the unit division is merely logical function division and may be actually implemented by other division modes. For example, a plurality of units or components may be combined or integrated into another system, or some features may be ignored or not performed. In addition, the displayed or discussed mutual couplings or direct couplings or communication connections among the components may be implemented by means of some interfaces. The indirect couplings or communication connections between the devices or units may be implemented in electronic, mechanical, or other forms.

The units described as separate components may or may not be physically separate, and the components displayed as units may or may not be physical units, may be located at one position, or may be distributed on a plurality of network units. A part of or all of the units may be selected according to actual needs to achieve the objectives of the solutions of the embodiments.

In addition, the functional units in the embodiments of the disclosure may be integrated into one processing unit, or each of the units may exist as an independent unit, or two or more units are integrated into one unit, and the integrated unit may be implemented in the form of hardware, or may be implemented in the form of a hardware and software functional unit.

A person of ordinary skill in the art may understand that all or some operations for implementing the foregoing method embodiments may be achieved by a program by instructing related hardware; the foregoing program is stored in a computer-readable storage medium; when the program is executed, operations including the foregoing method embodiments are performed. Moreover, the foregoing storage medium includes various media capable of storing a program code, such as a mobile storage device, an ROM, an RAM, a magnetic disk, or an optical disk.

Or, when the foregoing integrated unit of the disclosure is implemented in the form of a software functional module and sold or used as an independent product, the integrated unit may also be stored in one computer-readable storage medium. Based on such an understanding, the technical solutions in the embodiments of the disclosure or a part thereof contributing to the prior art may be essentially embodied in the form of a software product. The computer software product is stored in one storage medium and includes several instructions so that one computer device (which may be a personal computer, a server, a network device, and the like) implements all or a part of the method in the embodiments of the disclosure. Moreover, the storage medium above includes various media capable of storing a program code, such as a mobile storage device, an ROM, an RAM, a magnetic disk, or an optical disk.

The descriptions above are only specific implementations of the disclosure. However, the scope of protection of the disclosure is not limited thereto. Within the technical scope disclosed by the disclosure, any variation or substitution that can be easily conceived of by a person skilled in the art should all fall within the scope of protection of the disclosure. Therefore, the scope of protection of the disclosure should be determined by the scope of protection of the foregoing claims.

The invention claimed is:
1. An image processing method, comprising:
    obtaining a first image, identifying a facial region in the first image, and determining keypoint information related to the facial region, wherein the keypoint information comprises keypoint information of the facial region and external edge keypoint information, and a region corresponding to the external edge keypoint information comprises the facial region, wherein the region corresponding to the external edge keypoint information is larger than the facial region; and
    determining a plurality of deformation regions based on the keypoint information related to the facial region, and performing image deformation processing on the facial region based on at least part of the plurality of deformation regions to generate a second image,
    wherein performing image deformation processing on the facial region based on at least part of the plurality of deformation regions comprises:
        determining a first target region to be processed in the facial region, wherein the first target region is an eye corner region; the eye corner region comprises an eye corner region of a left eye and/or an eye corner region of a right eye;
        determining a deformation region corresponding to the first target region from the plurality of deformation regions based on keypoint information corresponding to the first target region, comprising:
            determining a third group of deformation regions corresponding to the eye corner region of the left eye from the plurality of deformation regions based on keypoint information corresponding to the eye corner region of the left eye, and/or determining a fourth group of deformation regions corresponding to the eye corner region of the right eye from the plurality of deformation regions based on keypoint information corresponding to the eye corner region of the right eye; and
        performing image deformation processing on the deformation region corresponding to the first target region, comprising:

stretching or compressing the third group of deformation regions and/or the fourth group of deformation regions in a first specific direction to adjust a position of an eye corner in a left eye region and/or a position of an eye corner in a right eye region.

2. The method according to claim 1, wherein the keypoint information of the facial region comprises keypoint information of an organ of the facial region and keypoint information of an edge of the facial region; the edge of the facial region corresponds to a contour of the facial region; and
the keypoint information of the organ comprises center keypoint information of the organ and/or contour keypoint information of the organ,
determining the plurality of deformation regions based on the keypoint information related to the facial region comprises:
determining the plurality of deformation regions based on any three adjacent keypoints corresponding to the keypoint information.

3. The method according to claim 1, wherein the first target region is an eye region; the eye region comprises the left eye region and/or the right eye region;
determining the deformation region corresponding to the first target region from the plurality of deformation regions based on the keypoint information corresponding to the first target region comprises:
determining a first group of deformation regions corresponding to the left eye region from the plurality of deformation regions based on keypoint information corresponding to the left eye region, and/or determining a second group of deformation regions corresponding to the right eye region from the plurality of deformation regions based on keypoint information corresponding to the right eye region; and
performing image deformation processing on the deformation region corresponding to the first target region comprises:
performing image deformation processing on the first group of deformation regions and/or the second group of deformation regions;
wherein an image deformation direction of the first group of deformation regions is opposite to an image deformation direction of the second group of deformation regions so as to increase or decrease a distance between the left eye region and the right eye region.

4. The method according to claim 1, wherein the first target region is an eye region; the eye region comprises the left eye region and/or the right eye region;
determining the deformation region corresponding to the first target region from the plurality of deformation regions based on the keypoint information corresponding to the first target region comprises:
determining a fifth group of deformation regions corresponding to the left eye region from the plurality of deformation regions based on keypoint information corresponding to the left eye region, and/or determining a sixth group of deformation regions corresponding to the right eye region from the plurality of deformation regions based on keypoint information corresponding to the right eye region; and
performing image deformation processing on the deformation region corresponding to the first target region comprises:
performing deformation processing on the fifth group of deformation regions so that a contour keypoint of the left eye region is rotated with respect to a center keypoint of the left eye region, wherein a rotation angle of the contour keypoint of the left eye region satisfies a first set angle, and/or performing deformation processing on the sixth group of deformation regions so that a contour keypoint of the right eye region is rotated with respect to a center keypoint of the right eye region, wherein a rotation angle of the contour keypoint of the right eye region satisfies a second set angle.

5. The method according to claim 1, wherein the first target region is a nose region;
determining the deformation region corresponding to the first target region from the plurality of deformation regions based on the keypoint information corresponding to the first target region comprises:
determining a seventh group of deformation regions corresponding to the nose region from the plurality of deformation regions based on keypoint information corresponding to the nose region; and
performing image deformation processing on the deformation region corresponding to the first target region comprises:
stretching or compressing the seventh group of deformation regions in a second specific direction to lengthen or shorten the nose region.

6. The method according to claim 1, wherein the first target region is a nosewing region; determining the deformation region corresponding to the first target region from the plurality of deformation regions based on the keypoint information corresponding to the first target region comprises:
determining an eighth group of deformation regions corresponding to the nosewing region from the plurality of deformation regions based on keypoint information corresponding to the nosewing region; and
performing image deformation processing on the deformation region corresponding to the first target region comprises:
compressing or stretching the eighth group of deformation regions in a third specific direction to narrow or widen the nosewing region.

7. The method according to claim 1, wherein the first target region is a chin region or a philtrum region; determining the deformation region corresponding to the first target region from the plurality of deformation regions based on the keypoint information corresponding to the first target region comprises:
determining a ninth group of deformation regions corresponding to the chin region or the philtrum region from the plurality of deformation regions based on keypoint information corresponding to the chin region or the philtrum region; and
performing image deformation processing on the deformation region corresponding to the first target region comprises:
compressing or stretching the ninth group of deformation regions in a fourth specific direction to shorten or lengthen the chin region or the philtrum region.

8. The method according to claim 1, wherein the first target region is a mouth region; determining the deformation region corresponding to the first target region from the plurality of deformation regions based on the keypoint information corresponding to the first target region comprises:
determining a tenth group of deformation regions corresponding to the mouth region from the plurality of deformation regions based on keypoint information corresponding to the mouth region; and performing image deformation processing on the deformation region corresponding to the first target region comprises:
performing compressing processing on the tenth group of deformation regions in a direction from an edge of the mouth region to a center of the mouth region, or performing stretching processing on the tenth group of deformation regions in a direction from the center of the mouth region to the edge of the mouth region.

9. The method according to claim 1, determining the deformation region corresponding to the first target region from the plurality of deformation regions based on the keypoint information corresponding to the first target region comprises:
determining an eleventh group of deformation regions corresponding to the facial region from the plurality of deformation regions based on the keypoint information of an edge of the facial region; and
performing image deformation processing on the deformation region corresponding to the first target region comprises:
performing compressing processing on the eleventh group of deformation regions in a direction from the edge of the facial region to a midline of the facial region, or performing stretching processing on the eleventh group of deformation regions in a direction from the midline of the facial region to the edge of the facial region.

10. The method according to claim 1, wherein the first target region is a forehead region; determining the deformation region corresponding to the first target region from the plurality of deformation regions based on the keypoint information corresponding to the first target region comprises:
determining a twelfth group of deformation regions corresponding to the forehead region from the plurality of deformation regions based on keypoint information of the forehead region; and
performing image deformation processing on the deformation region corresponding to the first target region comprises:
performing stretching or compressing processing on the twelfth group of deformation regions in a fifth specific direction to raise or lower a hairline of the facial region, wherein the fifth specific direction is a direction in which a keypoint of the forehead region points to an eyebrow center closest to the keypoint of the forehead region, or the fifth specific direction is a direction in which the keypoint of the forehead region gets away from the eyebrow center closest to the keypoint of the forehead region.

11. The method according to claim 10, wherein the keypoint information of the forehead region is determined by:
determining at least three keypoints of the forehead region; and
determining the keypoint information of the forehead region based on the at least three keypoints and information of a first group of contour points below eyes in the facial region,
wherein a first keypoint of the at least three keypoints is located on a midline of the forehead region; and a second keypoint and a third keypoint of the at least three keypoints are located on two sides of the midline, and
wherein determining the keypoint information of the forehead region based on the at least three keypoints and the information of the first group of contour points below the eyes in the facial region comprises:
performing curve fitting based on keypoints located at two ends in the first group of contour points below the eyes in the facial region and the at least three keypoints to obtain curve fitting keypoint information; and
performing interpolation processing on the curve fitting keypoint information based on a curve interpolation algorithm to obtain the keypoint information of the forehead region.

12. The method according to claim 1, wherein determining the keypoint information related to the facial region comprises:
obtaining the keypoint information of an organ of the facial region and the keypoint information of an edge of the facial region by performing detection on the facial region through a facial keypoint detection algorithm; and obtaining the external edge keypoint information based on the keypoint information of the edge of the facial region.

13. The method according to claim 12, wherein obtaining the keypoint information of the edge of the facial region comprises: obtaining information of a first group of contour points below eyes in the facial region; and
determining information of a second group of contour points of the forehead region, and determining the keypoint information of the edge of the facial region based on the information of the first group of contour points and the information of the second group of contour points,
wherein obtaining the external edge keypoint information based on the keypoint information of the edge of the facial region comprises:
determining a relative position relationship between the keypoint information of the edge of the facial region and a center point of the facial region, wherein the relative position relationship comprises a distance between a keypoint of the edge of the facial region and the center point of the facial region, and a direction of the keypoint of the edge of the facial region with respect to the center point of the facial region; and
extending, based on the relative position relationship, a keypoint of a first edge toward an outside of the facial region by a preset distance to obtain an external edge keypoint corresponding to the keypoint of the first edge, wherein the keypoint of the first edge is any one of keypoints of the edge of the facial region, and the preset distance is related to a distance between the keypoint of the first edge and the center point of the facial region.

14. The method according to claim 1, further comprising:
determining a deflection parameter for the facial region, and determining a deformation parameter and a deformation direction corresponding to each deformation region in the at least part of the plurality of deformation regions based on the deflection parameter, so that image deformation processing is performed on the deformation region according to the corresponding deformation parameter and deformation direction.

15. The method according to claim 14, wherein determining the deflection parameter for the facial region comprises:
determining a left edge keypoint, a right edge keypoint, and a center keypoint of any region in the facial region, wherein the region comprises at least one of: a cheek region, a nose region, or a mouth region;

determining a first distance between the left edge keypoint and the center keypoint, and determining a second distance between the right edge keypoint and the center keypoint; and determining the deflection parameter for the facial region based on the first distance and the second distance.

16. The method according to claim 1, further comprising:

identifying a second target region in the facial region, and performing feature processing on the second target region to generate a third image, wherein the second target region comprises at least one of: a periocular region, a nasolabial fold region, a tooth region, an eye region, or a submalar triangle region.

17. An image processing apparatus, comprising:

a memory storing processor-executable instructions; and a processor arranged to execute the processor-executable instructions to perform operations of:

obtaining a first image, identifying a facial region in the first image, and determining keypoint information related to the facial region, wherein the keypoint information comprises keypoint information of the facial region and external edge keypoint information, and a region corresponding to the external edge keypoint information comprises the facial region, wherein the region corresponding to the external edge keypoint information is larger than the facial region; and determining a plurality of deformation regions based on the keypoint information related to the facial region, and performing image deformation processing on the facial region based on at least part of the plurality of deformation regions to generate a second image, wherein performing image deformation processing on the facial region based on at least part of the plurality of deformation regions comprises:

determining a first target region to be processed in the facial region, wherein the first target region is an eye corner region; the eye corner region comprises an eye corner region of a left eye and/or an eye corner region of a right eye;

determining a deformation region corresponding to the first target region from the plurality of deformation regions based on keypoint information corresponding to the first target region, comprising:

determining a third group of deformation regions corresponding to the eye corner region of the left eye from the plurality of deformation regions based on keypoint information corresponding to the eye corner region of the left eye, and/or determining a fourth group of deformation regions corresponding to the eye corner region of the right eye from the plurality of deformation regions based on keypoint information corresponding to the eye corner region of the right eye; and performing image deformation processing on the deformation region corresponding to the first target region, comprising:

stretching or compressing the third group of deformation regions and/or the fourth group of deformation regions in a first specific direction to adjust a position of an eye corner in a left eye region and/or a position of an eye corner in a right eye region.

18. A non-transitory computer-readable storage medium having stored thereon computer-readable instructions that, when executed by a processor, cause the processor to perform operations of an image processing method, the method comprising:

obtaining a first image, identifying a facial region in the first image, and determining keypoint information related to the facial region, wherein the keypoint information comprises keypoint information of the facial region and external edge keypoint information, and a region corresponding to the external edge keypoint information comprises the facial region, wherein the region corresponding to the external edge keypoint information and is larger than the facial region; and determining a plurality of deformation regions based on the keypoint information related to the facial region, and performing image deformation processing on the facial region based on at least part of the plurality of deformation regions to generate a second image, wherein performing image deformation processing on the facial region based on at least part of the plurality of deformation regions comprises:

determining a first target region to be processed in the facial region, wherein the first target region is an eye corner region; the eye corner region comprises an eye corner region of a left eye and/or an eye corner region of a right eye;

determining a deformation region corresponding to the first target region from the plurality of deformation regions based on keypoint information corresponding to the first target region, comprising:

determining a third group of deformation regions corresponding to the eye corner region of the left eye from the plurality of deformation regions based on keypoint information corresponding to the eye corner region of the left eye, and/or determining a fourth group of deformation regions corresponding to the eye corner region of the right eye from the plurality of deformation regions based on keypoint information corresponding to the eye corner region of the right eye; and performing image deformation processing on the deformation region corresponding to the first target region, comprising:

stretching or compressing the third group of deformation regions and/or the fourth group of deformation regions in a first specific direction to adjust a position of an eye corner in a left eye region and/or a position of an eye corner in a right eye region.

* * * * *